United States Patent
Iskander et al.

(10) Patent No.: US 11,055,462 B2
(45) Date of Patent: Jul. 6, 2021

(54) METHOD FOR GENERATING AN ELECTRONIC CIRCUIT MODELLING SUBSTRATE COUPLING EFFECTS IN AN INTEGRATED CIRCUIT

(71) Applicants: UNIVERSITÉ PIERRE ET MARIE CURIE, Paris (FR); CENTRE NATIONAL DE LA RECHERCHE SCIENTIFIQUE, Paris (FR)

(72) Inventors: Ramy Iskander, Paris (FR); Hao Zou, Villejuif (FR); Yasser Moursy, L'Hay-les-Roses (FR)

(73) Assignees: SORBONNE UNIVERSITE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 445 days.

(21) Appl. No.: 15/739,908

(22) PCT Filed: Jun. 24, 2016

(86) PCT No.: PCT/EP2016/064711
§ 371 (c)(1),
(2) Date: Dec. 26, 2017

(87) PCT Pub. No.: WO2016/207374
PCT Pub. Date: Dec. 29, 2016

(65) Prior Publication Data
US 2018/0189436 A1 Jul. 5, 2018

(30) Foreign Application Priority Data

Jun. 26, 2015 (EP) .................................... 15306016

(51) Int. Cl.
G06F 30/367 (2020.01)
G06F 30/398 (2020.01)
G06F 119/10 (2020.01)

(52) U.S. Cl.
CPC .......... G06F 30/367 (2020.01); G06F 30/398 (2020.01); *G06F 2119/10* (2020.01)

(58) Field of Classification Search
CPC ... G06F 30/367; G06F 30/398; G06F 2119/10
See application file for complete search history.

(56) References Cited

U.S. PATENT DOCUMENTS 6,480,986 B1  11/2002  Richer
7,203,629 B2*  4/2007  Ozis ..................... G06F 30/367
                                                      703/2
2013/0151226 A1  6/2013  Kanamoto et al.

OTHER PUBLICATIONS

Liu et al., "A Concurrent SUbstrate Coupling Noise Modeling Technique for Mixed-Signal Physical Design," IEEE, pp. 21-26, 1996.*

(Continued)

*Primary Examiner* — Vuthe Siek
(74) *Attorney, Agent, or Firm* — Kenealy Vaidya LLP (57) ABSTRACT

Some embodiments are directed to the design and manufacture of integrated circuits, and more particularly, some embodiments are directed to the electrical modeling of integrated circuits combining high voltage power devices with low voltage control logic blocks, and even more particularly, some embodiments are directed to the modeling of substrate coupling effects in these circuits.

8 Claims, 7 Drawing Sheets

(56) References Cited

OTHER PUBLICATIONS

Karimi et al., "Efficient and Accurate Modeling and Simulation Techniques for Substrate Coupling Analysis in Deep Submicron Mixed-Signal IC's," International Review on Modeling and Simulations (I.RE.MO.S.), vol. 3, n. 4, 12 pages, Aug. 2010.*

Zou, H., et al., "Substrate Noise Modeling with Dedicated CAD Framework for Smart Power ICs," 2015 IEEE International Symposium on Circuits and Systems (ISCAS), May 1, 2015, pp. 1554-1557.

Xou, H., et al., "A novel CAD framework for substrate modeling," The Institute of Electrical and Electronics Engineers, Inc. (IEEE) Conference Proceedings, Jun. 1, 2014, 4 pp.

Anonymous, "Homojunction—Wikipedia, the free encyclopedia," Jun. 9, 2013, Retrieved from the Internet: URL: https://en.wikipedia.org/w/index.php?title=Homojunction&oldid=559119122 [retrieved Dec. 10, 2015], p. 1.

International Search Report for PCT Patent App. No. PCT/EP2016/064711 (dated Sep. 20, 2016).

* cited by examiner

METHOD FOR GENERATING AN ELECTRONIC CIRCUIT MODELLING SUBSTRATE COUPLING EFFECTS IN AN INTEGRATED CIRCUIT

CROSS REFERENCE TO RELATED APPLICATION(S)

This application is a national phase filing under 35 C.F.R. § 371 of and claims priority to PCT Patent Application No. PCT/EP2016/064711, filed on Jun. 24, 2016, which claims the priority benefit under 35 U.S.C. § 119 of European Patent Application No. 15306016.5, filed on Jun. 26, 2015, the contents of each of which are hereby incorporated in their entireties by reference.

BACKGROUND

Some embodiments are directed to the design and manufacture of integrated circuits, and more particularly, some embodiments are directed to electrical modeling of integrated circuits combining high voltage power devices with low voltage control logic blocks, and even more particularly, the modeling of substrate coupling effects in these circuits.

Automotive applications may require more and more integration of high voltage (HV) power devices together with low voltage (LV) control logic blocks. This integration on a single substrate lead to the development of a new category of integrated circuit (IC), often called Smart Power ICs.

In a typical Smart Power IC, the power switch, the control logic and sensor circuit operate at different voltage levels and different temperatures. In such devices, induced substrate coupling noise becomes a critical issue due to switching of the power stage. During switching, substrate parasitic currents including or consisting of electrons and holes lead to a local shift of the substrate potential that can reach hundreds of millivolts. This is due to the presence of inductive loads which can cause forward/reverse biasing of diode junctions inside substrate. As a result, current paths driven by propagation of electrons and holes are collected by nearby sensitive analog and digital devices, even at long distance.

Minority carriers are injected into the substrate during switching of high voltage power stages, and propagated inside substrate. Collected current may cause malfunction of sensitive nearby low voltage devices and sometimes may be destructive due to the presence of triggered latch up. This is the major cause of failure and cost circuit redesign, since simulations cannot predict them.

For instance, the parasitic lateral NPN between a 50V NDMos and a low voltage NMOS transistor is difficult to characterize, because its electrical characteristics are dependent on the distance between the two devices which is layout dependent. This distance corresponds to the substrate base of the parasitic BJT.

Due to substrate noise coupling, the number of failures is now increasing. Industry reports say that for 10 to 15 years lifetime product chips, these have globally more than 10 versions of the chips during development and fabrication.

Standard parasitic extraction tools in accordance with the related art consider only the parasitic effect within device.

However, the commutation between devices (e.g. parasitic current injected from high voltage transistor and collected at low voltage transistor) due to minority carriers propagation is often neglected and hard to model since parasitic lateral bipolar between devices cannot be extracted from industrial tools. Numerous attempt to evaluate the substrate coupling noise from high-voltage devices was done by numerical solutions relying on semiconductors' physical behavior. However, experimental extraction methodology based on predicting a simple equivalent circuit from circuit layout is not convenient for a complex layout design and lack of accuracy.

Technology Computer-Aided-Design (TCAD) software are today the only tools available to evaluate the impact of minority carriers propagation. However, TCAD simulations can only be applied to a few discrete devices, since it applies finite-element method for numerically solving physical equations in 2D and 3D structures. This is usually time-consuming, in range of hours, depending on the complexity of layout structure. Thus, there is still no suitable solution to model the substrate coupling noise for automotive application.

In 2010, a novel model methodology was proposed in order to take into account the minority carriers propagation within circuit simulators. It includes or consists of the representation of the substrate with an equivalent parasitic network of diodes and resistances. This allows for the tracking of substrate coupling noise for a general circuit layout.

SUMMARY

However, there is still the problem of generating the equivalent network which models accurately the substrate behavior, the network being as simple as possible in order to reduce the computing load of the electrical simulation Therefore, some embodiments are directed to obtaining automatically an electrical network accurately modeling the parasitic effects in the substrate of the studied integrated circuit.

In a first embodiment, a method for generating an electrical circuit includes at least a network of diodes, resistors and/or homojunctions, the electrical circuit modelising the parasitic effects in a substrate of an integrated circuit including electronic devices, the integrated circuit being defined by a set of mask layer layouts and a technology rules file, includes:
  generating a simplified 3D layout of the integrated circuit from the set of mask layer layouts and the technology rules file by using only mask layers associated to technology layers involved in the parasitic effects;
  defining in the simplified layout a plurality of internal regions, each internal region corresponding to one electronic device of the integrated circuit and one external region corresponding to the part of the simplified 3D layout not included in any internal region;
  computing in parallel and independently:
    for each internal region, a 3D matrix of adjacent rectangular cuboids, such that there is a limit between at least two adjacent rectangular cuboids where there is a change of doping type or where there is a change of doping concentration in the simplified layout;
    for the external region, a mesh of adjacent rectangular cuboids with no overlap and no gap;
  extracting a parasitic component with two terminals between each pair of adjacent cuboids, each terminal being positioned at the center of one of the two adjacent cuboids, such as:
    if the two adjacent cuboids have two different doping types, defining the parasitic component as a diode; or if the two adjacent cuboids have the same doping type with the same doping concentration, defining the parasitic component as a resistor; or if the two adjacent cuboids have the same doping type and different concentrations, defining the parasitic component as a homojunction; and defining the electrical characteristics of each parasitic component based on the geometry of the adjacent cuboids and the technological parameters; and connecting all or most of the extracted parasitic components into an electrical circuit by considering each rectangular cuboid center as a node of the parasitic component network.

Advantageously, the method allows to automatically obtain an electronic circuit modeling the parasitic effects in the substrate of the studied integrated circuit. Furthermore, using two different partition technics for internal regions and external region allows for the reduction of the number of parasitic components in the final electronic circuit. Consequently, the following simulations are much more efficient.

This embodiment may include other features, alone or in combination, such as:

the mask layer layouts used to generate the simplified 3D layout include at least the doped substrate layers and the doped contact layers;

a set of xyz coordinates is applied onto the simplified 3D layout, where x and y coordinates define horizontal planes and z coordinate define the integrated circuit depth;

the 3D matrix of internal region is computed by:
scanning the mask layers for finding and collecting corner points of change in the doping type or the doping concentration;

flattening corner points to xy coordinates so that an horizontal rectangular tessellation is built in which each corner point is a corner of at least one rectangle;

constructing layers of rectangular cuboids by projecting the rectangular tessellation on the z axis, each layer depth corresponding to the depth of at least one corner point;

the internal regions are defined by:
scanning and detecting the outermost area of each internal regions;

collecting the lower left and upper right corner points of each internal regions;

defining rectangular cuboid with the lower left and upper right corner points as internal region;

for the external region, the mesh of rectangular cuboids is computed by:
flattening the lower left and upper right corner points of each internal region onto a xy plane;

building a rectangular tessellation in which each corner point is a corner of at least one rectangular cell;

if a rectangular cell is contained inside any one of the internal region area, flag it as "in region" and do nothing;

if not, verify if the rectangular cell can be merged with an adjacent rectangular cell for forming a merged rectangular cell.

In a second embodiment, a digital data storage medium is provided for encoding a machine-executable program of instructions to perform the method disclosed above.

In a third embodiment, a system for generating an electrical circuit includes at least a network of diodes, resistors and/or homojunctions, the electrical circuit modelising the parasitic effects in a substrate of an integrated circuit including electronic devices, the integrated circuit being defined by a set of mask layer layouts and a technology rules file, includes:

a generator of a simplified 3D layout of the integrated circuit from the set of mask layer layouts and the technology rules file by using only mask layers associated to technology layers involved in the parasitic effects;

a method for defining in the simplified 3D layout a plurality of internal regions, each internal region corresponding to one electronic device of the integrated circuit and one external region corresponding to the part of the simplified 3D layout not included in any internal region;

a computer to compute in parallel and independently:
for each internal region, a 3D matrix of adjacent rectangular cuboids, such that there is a limit between at least two adjacent rectangular cuboids where there is a change of doping type or where there is a change of doping concentration in the simplified layout;

for the external region, a mesh of adjacent rectangular cuboids with no overlap and no gap;

an extractor of a parasitic component with two terminals between each pair of adjacent cuboids, each terminal being positioned at the center of one of the two adjacent cuboids, such as:
if the two adjacent cuboids have two different doping types, defining the parasitic component as a diode; or if the two adjacent cuboids have the same doping type with the same doping concentration, defining the parasitic component as a resistor; or if the two adjacent cuboids have the same doping type and different concentrations, defining the parasitic component as a homojunction; and defining the electrical characteristics of each parasitic component based on the geometry of the adjacent cuboids and the technological parameters; and a network generator of all or most of the extracted parasitic components into an electrical circuit by considering each rectangular cuboid center as a node of the parasitic component network.

BRIEF DESCRIPTION OF THE FIGURES

Some embodiments are now described, by way of example only, and with reference to the accompanying drawings, in which.

DETAILED DESCRIPTION OF EXEMPLARY EMBODIMENTS

During design phase, an integrated circuit is defined by a set of mask layer layouts and a technology rules file. Each mask layer layout is a 3D drawing defining the geometry of a lithography mask of a defined microelectronic manufacturing process. For instance, there is a mask for a polysilicon layer, another mask for a contact layer, etc. During drawing of these mask layers, specific geometric rules associated to a given technology are enforced in order to obtain a coherent stack of layers.

The technology rules file contains the geometric rules, process rules such as the thickness of a given layer and also electrical rules such as the resistivity by square of a given layer.

Figure 1:
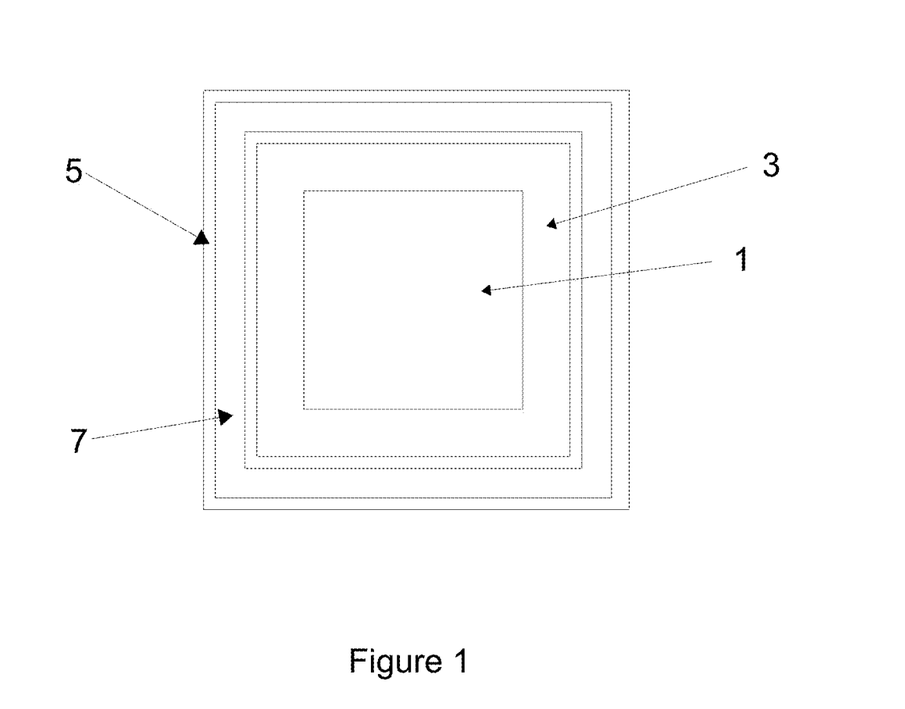
FIG. 1 schematically illustrates mask layer layouts of a simple diode.

FIG. 1 represents an extract of the set of mask layer layouts representing a simple diode. Area 1 is the contact area of a N well 3 which is enclosed by a P substrate 5 having a contact area 7.

Figure 2:
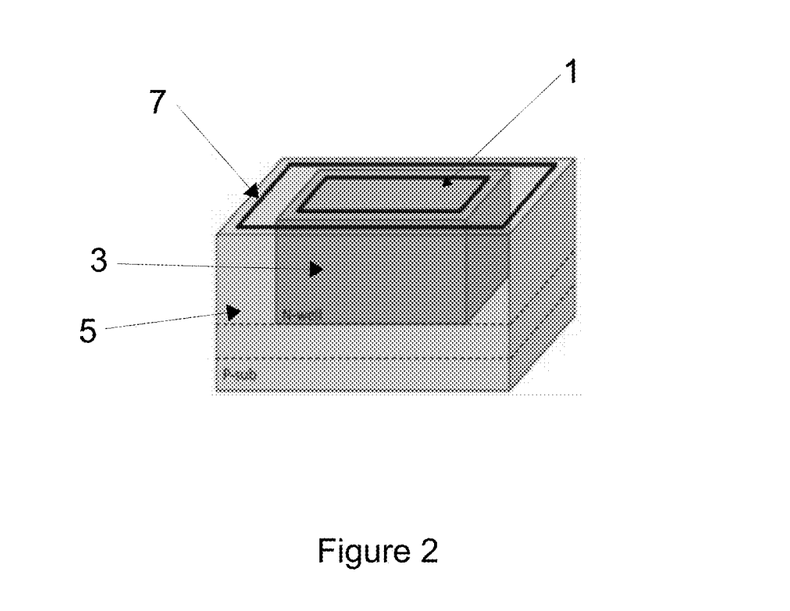
FIG. 2 illustrates the same diode in a 3D view.

FIG. 2 represents the same diode in a pseudo 3D view to show the relative thickness of each layer.

Figure 3:
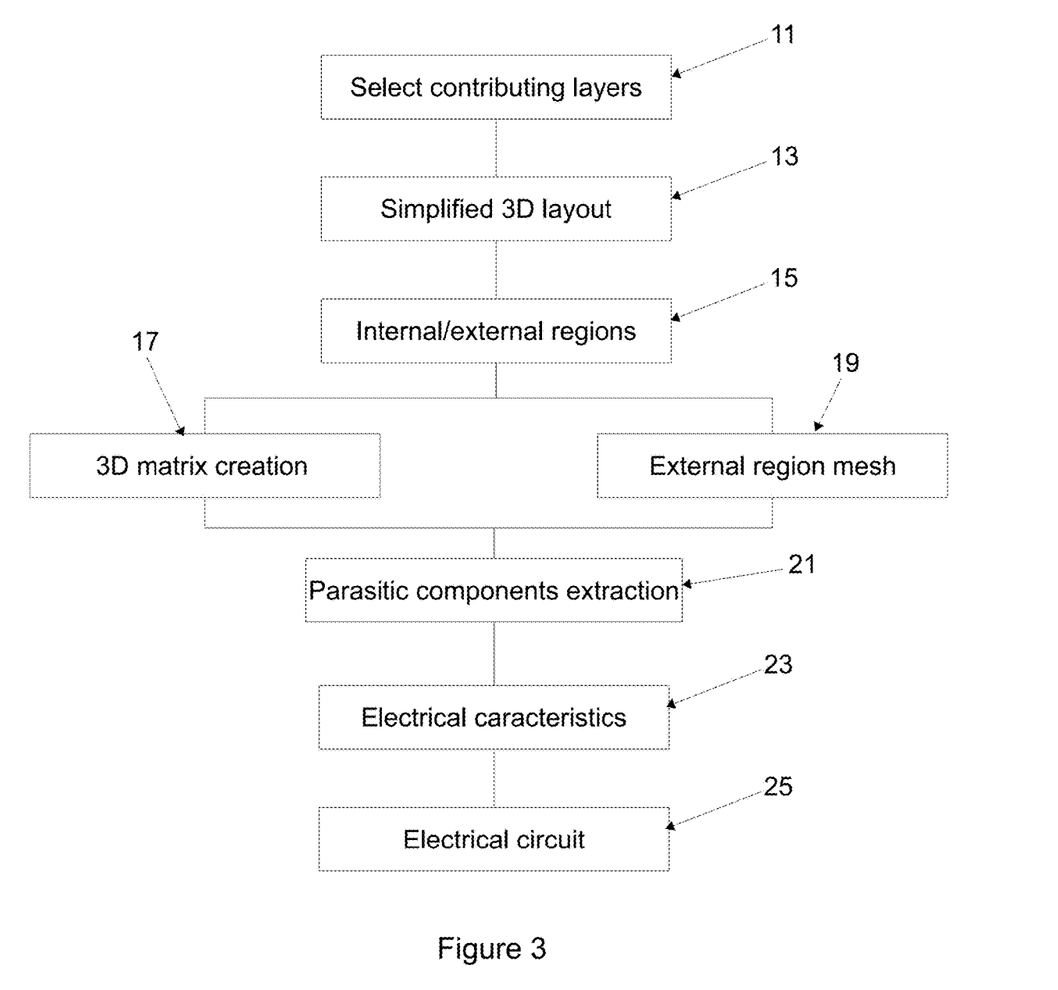
FIG. 3 is a flowchart of an embodiment of the method for generating an electrical circuit.

An advantage of some embodiments is to modelize the parasitic effects in a substrate of an integrated circuit, FIG. 3, only mask layers associated to technology layers involved in the parasitic effects are considered, step 11. For instance, contact layers and doping layers are considered but not the metal layers used to connect the different electronic components. In the example of the diode, the considered layers are the N well layer and the P+ and N+ layers of the contact area. These layers are called contributing layers.

From the considered set of mask layer layouts and the technology rules file, a simplified 3D layout similar to FIG. 2 is generated, step 13.

At step 15, in the 3D simplified layout, a plurality of internal regions is defined. Each internal region corresponds to one electronic device of the integrated circuit. And one external region corresponding to the part of the simplified 3D layout not included in any internal region is also defined. The external region is thus the complementary region of all or most of the internal regions in the 3D layout.

Then, in parallel and independently,
for each internal region, a 3D matrix of adjacent rectangular cuboids is computed, step 17, such that there is a limit between at least two adjacent rectangular cuboids where there is a change of doping type or where there is a change of doping concentration in the simplified layout;
for the external region, a mesh of adjacent rectangular cuboids with no overlap and no gap is computed, step 19.

For both types of region, there are some common rules for building the 3D matrix or the mesh:
The basic building block is a rectangle cuboid, i.e. a cuboid having 6 faces and all or most of the angles are right angles and opposite faces of a cuboid are equal;
A rectangle cuboid contains only one type of layer, i.e. same doping type and same doping concentration;
A consequence of the previous rule is that the interface between two doping types, for instance, correspond to faces of cuboids.

The cuboids define a partition of each region in the mathematical sense of a partition of a set: every element of a region is in exactly one of these cuboids; and
Two cuboids are adjacent when they have a face in common.

Detailed embodiments of steps 17 and 19 are disclosed after the general description of the present embodiment.

At step 21, a parasitic component with two terminals is extracted for each pair of adjacent cuboids, each terminal being positioned at the center of one of the two adjacent cuboids, such as:
if the two adjacent cuboids have two different doping types, the parasitic component is a diode; or
if the two adjacent cuboids have the same doping type with the same doping concentration, the parasitic component is a resistor; or
if the two adjacent cuboids have the same doping type and different concentrations, the parasitic component is a homojunction.

When the parasitic component is a diode, the orientation of the diode is defined by the doping type of each cuboids.

A homojunction is defined here only as a semiconductor interface that occurs between layers of similar semiconductor material having the same doping type, either N type or P type, but with different doping level.

At step 23, the electrical characteristics of each parasitic component is computed based on the geometry of the adjacent cuboids and the technological parameters.

For instance, the value of a resistance will be the product of the distance between the centers of the two cuboids by the resistivity of the considered layer.

At step 25, all or most of the extracted parasitic components are connected into an electrical circuit by considering each rectangular cuboid center as a node of the parasitic component network.

The electrical circuit is then ready to be inputted into an electrical simulator such as SPICE for analyzing its electrical behavior and particularly the impact of parasitic effects of the substrate.

In the following embodiments, a xyz coordinate system is defined where xy define a plane parallel to the surface of the integrated circuit and z defines its depth.

A detailed internal meshing strategy corresponding to step 17 is now disclosed, FIGS. 4A to 4F and FIG. 5.

Figure 4A:
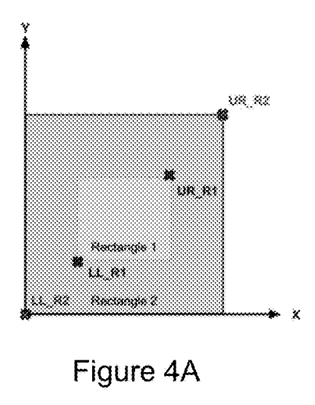
FIGS. 4A to 4F illustrates different steps of a detailed embodiment for creating a mesh of rectangular cuboids of the diode of FIGS. 1 and 2.
Figure 4B:
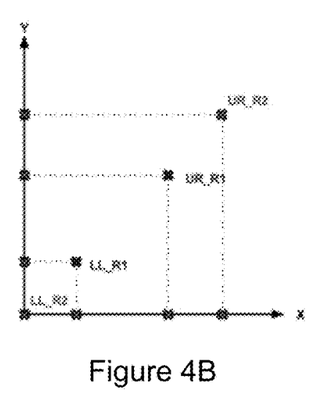
Figure 4C:
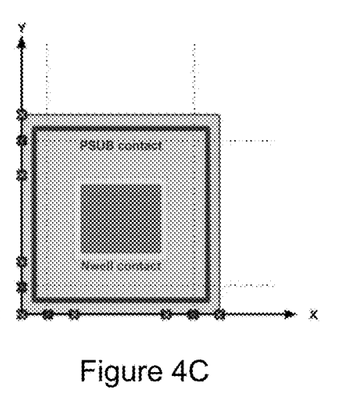

The internal meshing mechanism is based on collecting contributing corner points. The main steps are:
Collection of contributing points: by scanning the contributing layers, the extraction engine finds and collects, step 31, automatically the corner points of geometrical shapes as represented in FIG. 4A. For example, the upper right point UR_R1 and lower left point LL_R1 of rectangle 1.
Flattening corner points to xy mesh coordinate array: FIG. 4B shows that these coordinates are projected, step 33, onto a 2D xy plane, i.e. the z coordinate is set temporarily to 0, corresponding to the top surface. Then, FIG. 4C the contact layer is added, step 35. The mesh coordinates of the contact layer are computed so that the contact line is on a median of the associated rectangle.
Each extracted x coordinate combines, step 37, with every extracted y coordinate to represent one mesh point. In the example, it represents the generation of 36 mesh points, FIG. 4D.
Each 4 adjacent mesh points constructs, step 39, a rectangle mesh cell and two diagonal of them represent the geometrical size of the mesh cell. For instance, FIG.

4E, the upper left rectangle is represented by coordinates (x0, y4) and (x1, y5).

Figure 4D:
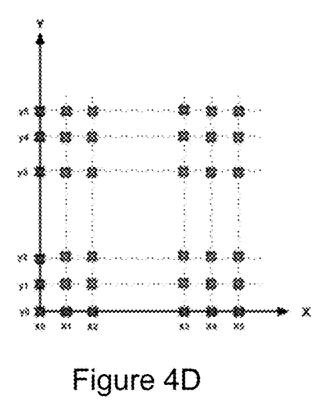
Figure 4E:
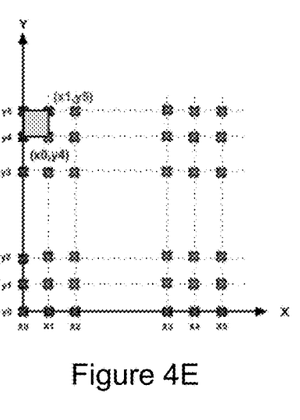
Figure 4F:
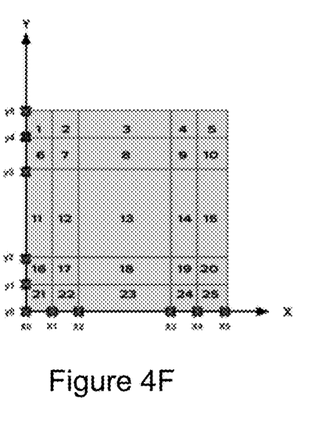
Figure 5:
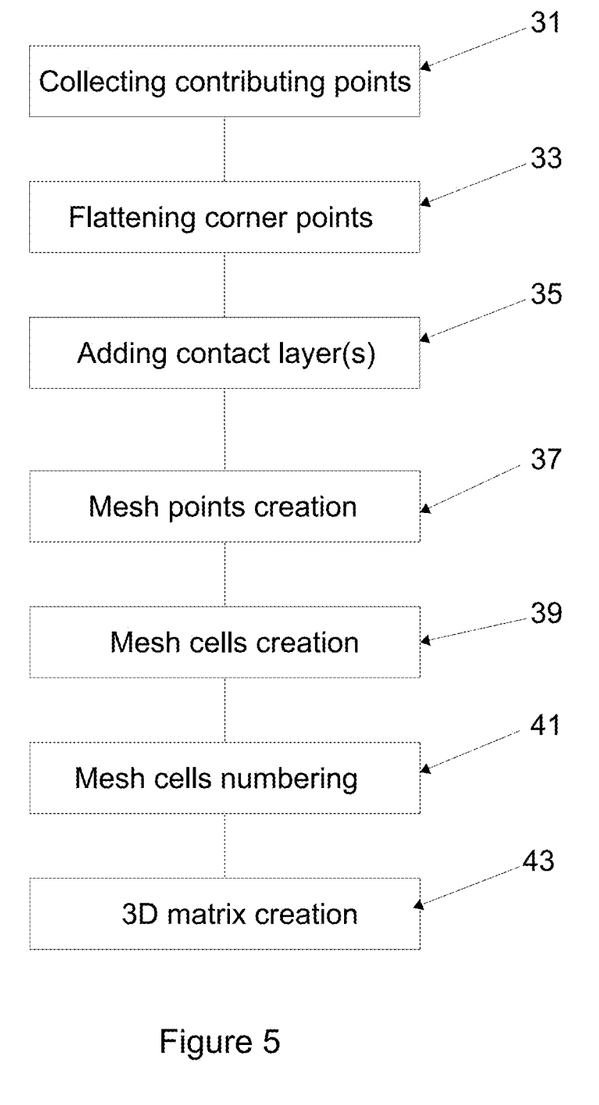
FIG. 5 is a flowchart of an embodiment of the method for generating a 3D matrix of an internal region.

Then each rectangle is numbered consecutively, step 41, from the top left rectangle to the bottom right rectangle, row by row, FIG. 4F.

Then the z coordinates are taken into account to generate a 3D matrix, step 43. The number of cuboid layers and the thickness of each cuboid layer is defined by the different z coordinates of the corner points.

In pseudo code, the meshing algorithm for internal region can be written as:

```
Function construction (mesh points: mp)
    Create a new empty cells table array A
    Set row number r = number of uniqueYMesh-1
    Set colon number c = number of uniqueXMesh-1
    For each integer from 1 to r
        Create a new empty cells array a
        For each integer from 1 to c
            Get new LL and UR points from mp
            Create new cell i with points (LL, UR)
            Set cell's index number
            Appending a to array A
        End For
        Appending a to array A
    End For
    Return table array A
End Function
```

A detailed external meshing strategy corresponding to step 19 is now disclosed, FIGS. 6A to 6G and FIG. 7.

The lower left LL and upper right UR corner points of each internal regions have been previously detected as shown FIG. 4A, step 51.

Figure 7:
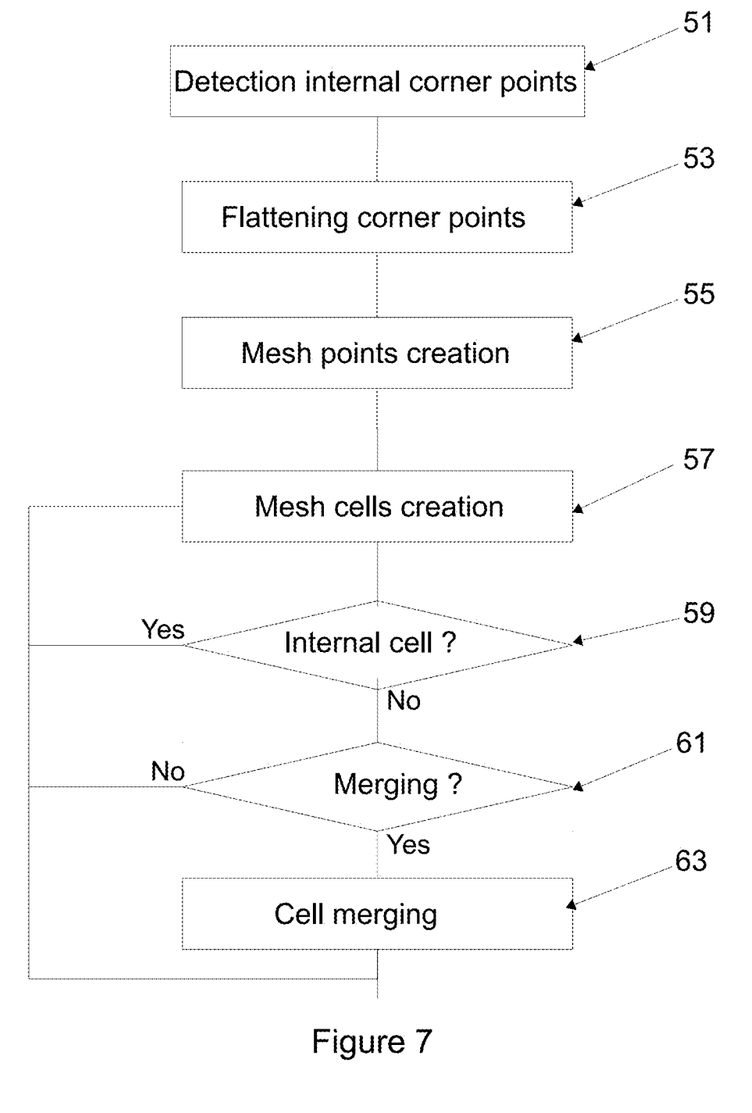
FIG. 7 is a flowchart of an embodiment of the method for generating a mesh of an external region.

Similarly with the internal meshing strategy disclosed here above, the LL and UR corner points of internal regions are projected onto an xy mesh coordinate plane, constituting a xy mesh coordinate array, step 53.

From this array, and in a process similar to the process generating FIGS. 4D and 4E, all or most of the mesh points are generated, step 55, and mesh cells, step 57.

Then, all or most of the mesh cells are scanned for verifying if the mesh cell is contained inside any one of the internal region area, step 59. If it is so, the mesh cell is flagged as «in region» and will not be constructed. Otherwise, each mesh cell is analyzed to determine if it can be merged with adjacent cells, step 61.

If it is possible to merge two adjacent cells, a new cell is created, step 63 by merging the two adjacent cells and the new cell is flagged as «is merged» and contains the synthetized information of both cells.

Figure 6A:
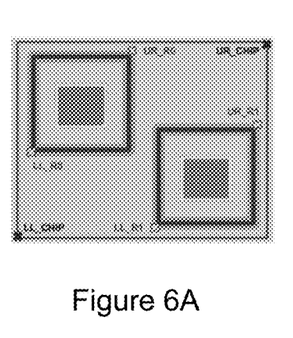
FIG. 6A to 6G illustrates different steps of a detailed embodiment for creating a mesh of an external region.
Figure 6B:
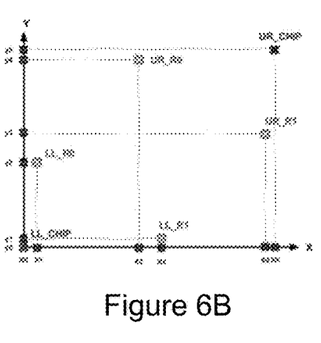
Figure 6C:
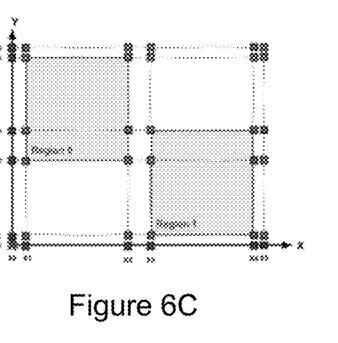
Figure 6D:
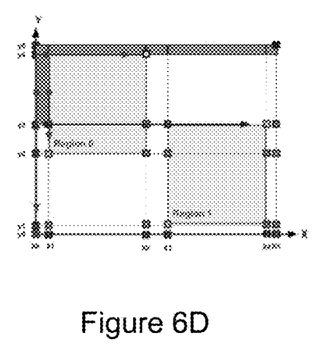
Figure 6E:
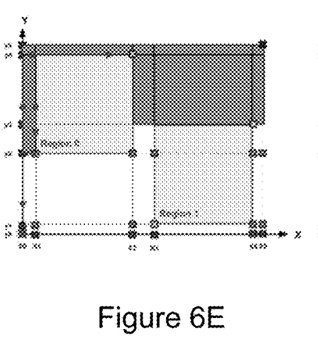
Figure 6F:
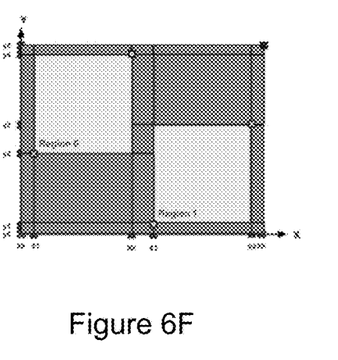
Figure 6G:
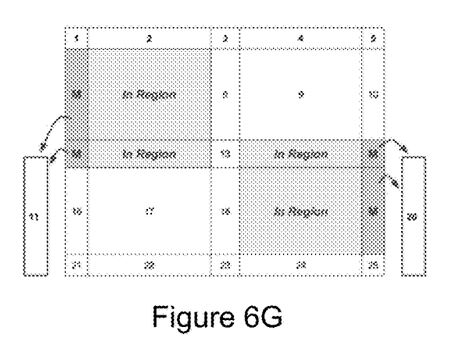

FIGS. 6D to 6F illustrate the merging mechanism and FIG. 6G illustrates the numbering and flagging techniques.

In pseudo code, the meshing algorithm of external region can be written as:

```
Function construction (mesh points: mp)
    Create a new empty cells table array A
    Set row number r = number of uniqueYRegion-1
    Set colon number c = number of uniqueXRegion-1
    For each integer from 1 to r
        Create a new empty cells array a
        For each integer from 1 to c
            Get new LL and UR points from mp
            Create new cell i by points (LL, UR)
            Verify that cell inside internal regions
            If cell inside internal region
                Set cell's status to be in Region
            End If
            Verify that cell's left side is validate
            Verify that cell's right side is validate
            Verify that cell's top side is validate
            Verify that cell's bottom side is validate
            If not all the four side are validate
                Set cell's status to be merged
            End If
            Set cell's index number
            Appending i to array a
        End For
        Appending a to array A
    End For
    Return table array A
End Function
```

Figure 8A:
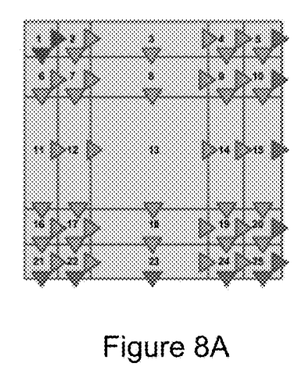
FIGS. 8A and 8B illustrates the component extraction mechanism on the 3D matrix built up at FIGS. 4A to 4D.
Figure 8B:
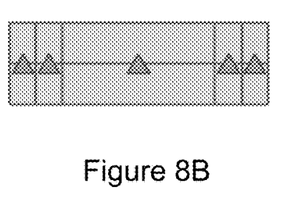

FIGS. 8A and 8B illustrates the component extraction mechanism on the 3D matrix built up at FIGS. 4A to 4D.

In the 3D matrix, for each cuboid, lateral adjacent cuboids and vertical adjacent cuboids are considered to define the horizontal and the vertical contributions of the cuboid, the cuboid being a node of the built electrical network.

For instance, on FIG. 8A, the cuboid 1 has two adjacent cuboids numbered 2 (at right) and 6 (at bottom).

On vertical contribution, by construction of the 3D matrix, each cuboid has only one adjacent cuboid as shown on FIG. 8B.

Figure 9:
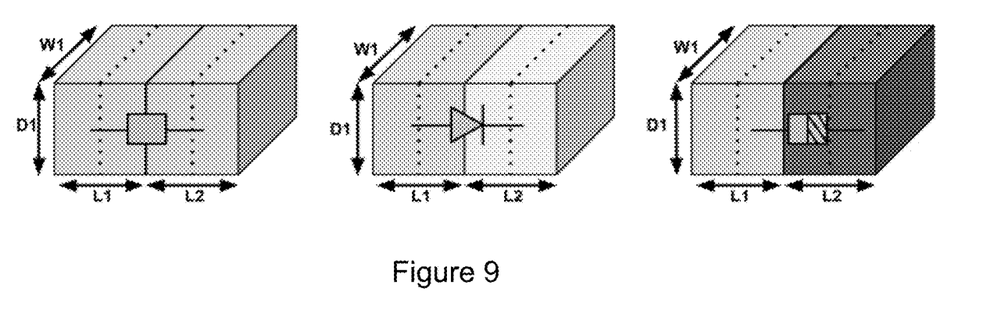
FIG. 9 schematically illustrates the characteristics of adjacent cuboids for defining the electrical parameter of the associated parasitic component.

In a 3D view, FIG. 9, a cuboid has length, width and depth. Therefore, each cuboid represents a specific space of the substrate and contains three types of information: technology (doping type), geometry (width, length an depth) and algoritmic (position inside the 3D mesh network).

The following lines illustrate the substrate component extraction algorithm of internal and external regions.

```
Function extract_internal (Cells table array: A)
    For each integer from 1 to r
        Get cell array a in this row from A
        For each integer from 1 to c
            Get cell i in this colon
            If cell i has right neighbouring cell
                Get neighbour cell j at c+1
                If i and j are the same material
                    Create parasitic resistance
                Else if one of them inside TRENCH
                    Create capacitor
                Else if they are both inside TRENCH
                    Create resistance inside TRENCH
                Else if they are not the same
                    Create parasitic diode
                End If
            End If
            If Cell i has bottom neighbouring cell
                Get neighbouring cell k at r+1
                ... (Similar with right neighbour cell)
            End If
        End For
    End For
End Function
Function extract_external (cells table array: A)
    For each integer from 1 to r
        Get cell array a in this row from A
        For each integer from 1 to c
            Get cell i in this colon
            If cell i has right neighbour cell
                Get neighbour cell j
                If i and j both not in internal region
                    Create a substrate component
                Else if one of the neighbour cells is not inside internal regions
                    Get collected points at this boundary
                    Geometrical computation of these points
                    For number of points-1
                        Create a region boundary component
```

-continued

```
            End For
        Else if both neighbour cells are inside internal
regions
            None of components is created
        End If
      End If
      If cell i has bottom neighbour cell
        ... (Similar with right neighbour cell)
      End If
    End For
  End For
End Function
```

A person of ordinary skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all or most of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

The functions of the various elements shown in the figures., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any routers shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of some embodiments. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of some embodiments. It will thus be appreciated that those of ordinary skill in the art will be able to devise various arrangements that, although not explicitly described or shown herein, embody the principles of some embodiments and are included within its spirit and scope. Furthermore, all or most of the examples recited herein are principally intended expressly to be only for pedagogical purposes to aid the reader in understanding the principles of some embodiments and the concepts contributed by the inventor(s) to furthering the art, and are to be construed as being without limitation to such specifically recited examples and conditions. Moreover, all or most of the statements herein reciting principles, aspects, and some embodiments, as well as specific examples thereof, are intended to encompass equivalents thereof.

The invention claimed is:

1. A method for generating an electrical circuit that includes at least a network of diodes, resistors and/or homojunctions, the electrical circuit modelling parasitic effects in a substrate of an integrated circuit that includes electronic devices, the integrated circuit being defined by a set of mask layer layouts and a technology rules file, the method comprising:

generating a simplified 3D layout of the integrated circuit from the set of mask layer layouts and the technology rules file by using only mask layers associated to technology layers involved in the parasitic effects;

defining in the 3D simplified layout a plurality of internal regions, each internal region corresponding to one electronic device of the integrated circuit and one external region corresponding to the part of the simplified 3D layout not included in any internal region;

computing in parallel and independently:
  for each internal region, a 3D matrix of adjacent rectangular cuboids, such that there is a limit between at least two adjacent rectangular cuboids where there is a change of doping type or where there is a change of doping concentration in the simplified layout;
  for the external region, a mesh of adjacent rectangular cuboids with no overlap and no gap;

extracting a parasitic component with two terminals between each pair of adjacent cuboids, each terminal being positioned at the center of one of the two adjacent cuboids, wherein:
  if the two adjacent cuboids have two different doping types, defining the parasitic component as a diode; or
  if the two adjacent cuboids have the same doping type with the same doping concentration, defining the parasitic component as a resistor; or
  if the two adjacent cuboids have the same doping type and different concentrations, defining the parasitic component as a homojunction; and
  defining the electrical characteristics of each parasitic component based on the geometry of the adjacent cuboids and the technological parameters;

connecting all extracted parasitic components into an electrical circuit by considering each rectangular cuboid center as a node of the parasitic component network;

applying a set of xyz coordinates onto the simplified 3D layout, where x and y coordinates define horizontal planes and z coordinate define the integrated circuit depth; and computing the 3D matrix of internal region by:
  scanning the mask layers for finding and collecting corner points of change in the doping type or the doping concentration;
  flattening corner points to xy coordinates so that an horizontal rectangular tessellation is built in which each corner point is a corner of at least one rectangle; and constructing layers of rectangular cuboids by projecting the rectangular tessellation on the z axis, each layer depth corresponding to the depth of at least one corner point.

2. The method according to claim 1, wherein the mask layer layouts used to generate the simplified 3D layout comprise at least the doped substrate layers and the doped contact layers.

3. The method according to claim 2, wherein a set of xyz coordinates is applied onto the simplified 3D layout, where x and y coordinates define horizontal planes and z coordinate define the integrated circuit depth.

4. The method according to claim 1, wherein the internal regions are defined by:
scanning and detecting the outermost area of each internal regions;
collecting the lower left and upper right corner points of each internal regions; and
defining rectangular cuboid with the lower left and upper right corner points as internal region.

5. The method according to claim 4, wherein, for the external region, the mesh of rectangular cuboids is computed by:
flattening the lower left and upper right corner points of each internal region onto a xy plane;
building a rectangular tessellation in which each corner point is a corner of at least one rectangular cell;
if a rectangular cell is contained inside any one of the internal region area, flag it as "in region" and do nothing; and
if not, verify if the rectangular cell can be merged with an adjacent rectangular cell for forming a merged rectangular cell.

6. A digital data storage medium encoding a machine-executable program of instructions to perform the method according to claim 1.

7. The method according to claim 1, wherein the internal regions are defined by:
scanning and detecting the outermost area of each internal regions;
collecting the lower left and upper right corner points of each internal regions; and
defining rectangular cuboid with the lower left and upper right corner points as internal region.

8. A system for generating an electrical circuit that includes at least a network of diodes, resistors and/or homojunctions, the electrical circuit modelling parasitic effects in a substrate of an integrated circuit that includes electronic devices, the integrated circuit being defined by a set of mask layer layouts and a technology rules file, the system comprising:
a generator of a simplified 3D layout of the integrated circuit from the set of mask layer layouts and the technology rules file by using only mask layers associated to technology layers involved in the parasitic effects;
means for defining in the simplified 3D layout a plurality of internal regions, each internal region corresponding to one electronic device of the integrated circuit and one external region corresponding to the part of the simplified 3D layout not included in any internal region;
a computer to compute in parallel and independently:
for each internal region, a 3D matrix of adjacent rectangular cuboids, such that there is a limit between at least two adjacent rectangular cuboids where there is a change of doping type or where there is a change of doping concentration in the simplified layout;
for the external region, a mesh of adjacent rectangular cuboids with no overlap and no gap; and
an extractor of a parasitic component with two terminals between each pair of adjacent cuboids, each terminal being positioned at the center of one of the two adjacent cuboids, wherein:
if the two adjacent cuboids have two different doping types, defining the parasitic component as a diode; or
if the two adjacent cuboids have the same doping type with the same doping concentration, defining the parasitic component as a resistor; or
if the two adjacent cuboids have the same doping type and different concentrations, defining the parasitic component as a homojunction; and
defining the electrical characteristics of each parasitic component based on the geometry of the adjacent cuboids and the technological parameters; and
a network generator of all extracted parasitic components into an electrical circuit by considering each rectangular cuboid center as a node of the parasitic component network
the computer being further configured to cause the system to perform the following:
applying a set of xyz coordinates onto the simplified 3D layout, where x and y coordinates define horizontal planes and z coordinate define the integrated circuit depth;
computing the 3D matrix of internal region by:
scanning the mask layers for finding and collecting corner points of change in the doping type or the doping concentration;
flattening corner points to xy coordinates so that an horizontal rectangular tessellation is built in which each corner point is a corner of at least one rectangle; and
constructing layers of rectangular cuboids by projecting the rectangular tessellation on the z axis, each layer depth corresponding to the depth of at least one corner point.

* * * * *